(12) United States Patent  
Kerver

(10) Patent No.: US 10,699,507 B2
(45) Date of Patent: Jun. 30, 2020

(54) METHOD OF VERIFYING AN AUTHENTICITY OF A PRINTED ITEM AND DATA PROCESSING TERMINAL

(71) Applicant: FiliGrade B.V., Twello (NL)

(72) Inventor: Johannes Bernardus Kerver, Eindhoven (NL)

(73) Assignee: FILIGRADE B.V., Twello (NL)

( * ) Notice: Subject to any disclaimer, the term of this patent is extended or adjusted under 35 U.S.C. 154(b) by 256 days.

(21) Appl. No.: 15/564,781

(22) PCT Filed: Apr. 11, 2016

(86) PCT No.: PCT/NL2016/050250
§ 371 (c)(1),
(2) Date: Oct. 6, 2017

(87) PCT Pub. No.: WO2016/163887
PCT Pub. Date: Oct. 13, 2016

(65) Prior Publication Data
US 2018/0114393 A1 Apr. 26, 2018

(30) Foreign Application Priority Data
Apr. 9, 2015 (NL) .................................. 2014608

(51) Int. Cl.
*G07D 7/202* (2016.01)
*H04N 1/32* (2006.01)
(Continued)

(52) U.S. Cl.
CPC ......... *G07D 7/202* (2017.05); *G06K 9/00577* (2013.01); *G06K 9/6212* (2013.01);
(Continued)

(58) Field of Classification Search
None
See application file for complete search history.

(56) References Cited

U.S. PATENT DOCUMENTS 5,751,854 A * 5/1998 Saitoh ............... G06K 9/46
382/218
6,272,248 B1 * 8/2001 Saitoh ............... G06K 9/46
382/218
(Continued)

FOREIGN PATENT DOCUMENTS

CN 1925546 A 3/2007
CN 101493938 A 7/2009
(Continued)

OTHER PUBLICATIONS

Chinese Patent Application No. 201680028780.8, Office Action dated Aug. 7, 2019.

*Primary Examiner* — Mekonen T Bekele
*Assistant Examiner* — Nathan J Bloom
(74) *Attorney, Agent, or Firm* — Hoffman & Baron, LLP

(57) ABSTRACT

A method of verifying an authenticity of a printed item includes: photographing the printed item to obtain a photographic image of the printed item, retrieving reference data of the printed item, the reference data including a reference image of the printed item, determining a test noise parameter from the photographic image of the printed item, determining a reference noise parameter from the reference image, comparing the test noise parameter of the photographic image of the printed item to the reference noise parameter of the reference image, and determining an authenticity of the printed item from a result of the comparing. The determining the authenticity of the printed item from the result of the comparing may include establishing from the reference noise parameter of the reference image and the test noise parameter of the printed item.

26 Claims, 8 Drawing Sheets

(51) Int. Cl.
  *G06K 9/62* (2006.01)
  *G07D 7/20* (2016.01)
  *G06K 9/00* (2006.01)
  *G06T 7/00* (2017.01)
  *H04N 1/00* (2006.01)
  *G06T 7/90* (2017.01)

(52) U.S. Cl.
  CPC .............. *G06T 7/0002* (2013.01); *G06T 7/90* (2017.01); *G06T 7/97* (2017.01); *G07D 7/205* (2013.01); *G07D 7/2016* (2013.01); *H04N 1/00846* (2013.01); *H04N 1/32133* (2013.01); *H04N 1/32309* (2013.01); *G06T 2201/0065* (2013.01); *G06T 2207/10024* (2013.01); *G06T 2207/30144* (2013.01); *H04N 2201/3233* (2013.01); *H04N 2201/3271* (2013.01); *Y10S 283/902* (2013.01)

(56) References Cited

U.S. PATENT DOCUMENTS

| | | | |
|---|---|---|---|
| 2002/0061121 A1* | 5/2002 | Rhoads | G06T 1/0071 382/100 |
| 2004/0086197 A1* | 5/2004 | Fletcher | G06T 1/0064 382/276 |
| 2007/0003341 A1* | 1/2007 | Guan | G03G 21/043 399/366 |
| 2008/0219503 A1* | 9/2008 | Di Venuto | G06K 9/00577 382/103 |
| 2010/0080471 A1 | 4/2010 | Haas et al. | |
| 2011/0038012 A1 | 2/2011 | Massicot et al. | |
| 2012/0045093 A1* | 2/2012 | Salminen | G06K 9/00295 382/103 |
| 2012/0300985 A1* | 11/2012 | Ito | G06F 21/32 382/103 |
| 2015/0228045 A1* | 8/2015 | Mehta | G06T 1/0064 382/103 |
| 2019/0087926 A1* | 3/2019 | Crutchfield | H04N 5/77 |

FOREIGN PATENT DOCUMENTS

| | | |
|---|---|---|
| EP | 1780635 A2 | 5/2007 |
| WO | 2013/179250 A1 | 12/2013 |

\* cited by examiner

METHOD OF VERIFYING AN AUTHENTICITY OF A PRINTED ITEM AND DATA PROCESSING TERMINAL

CROSS-REFERENCE TO RELATED APPLICATIONS

This application is the National Stage of International Application No. PCT/NL2016/050250 filed Apr. 11, 2016, which claims the benefit of Netherlands Application No. NL 2014608, filed Apr. 9, 2015, the contents of which is incorporated by reference herein.

FIELD OF THE INVENTION

The invention relates to a method for verifying an authenticity of a printed item. Furthermore, the invention relates to a data processing terminal and a method of copy protecting a printed item.

BACKGROUND OF THE INVENTION

In order to establish if a printed item is authentic, visual identification techniques are commonly used. Thereto, the printed item is inspected by a (generally trained, experienced) inspector who seeks for deviations in a pattern of printing as compared to the original pattern. The inspector may seek deviations in color (in this document, the terms color and colour may be interchanged), deviations in sharpness, incorrect positions of printed objects in relation to other objects or deviations in fine patterns, such as pitch, colour and/or contrast.

A problem associated with the known method is that high quality copies may not always be recognized. In particular, when high quality equipment has been used to create copies of the printed item, the quality of the copy may be high, making it virtually impossible, even for a trained inspector, to distinguish a copy of the printed item from an original of the printed item.

The invention aims to provide an improved verification of an authenticity of the printed item.

SUMMARY OF THE INVENTION

In order to achieve this goal, according to an embodiment of the invention, there is provided a method of verifying an authenticity of a printed item, the method comprising:
a) photographing the printed item to obtain a photographic image of the printed item,
b) retrieving reference data of the printed item, the reference data comprising a reference image of an authentic one of the printed item, the authentic one of the printed item comprising a noise pattern in at least two colour channels,
c) determining a test noise parameter from the photographic image of the printed item, wherein the test noise parameter reflects (i.e. provides a representation of) a noise pattern in at least two colour channels of the photographic image of the printed item,
d) determining a reference noise parameter from the reference image, wherein the reference noise parameter reflects (i.e. provides a representation of) the noise pattern in the at least two colour channels of the reference image,
e) comparing the test noise parameter to the reference noise parameter, thereby deriving, from a difference between the test noise parameter and the reference noise parameter, a noise pattern change (i.e. a noise pattern difference) as a result of a colour modulation change (i.e. a colour modulation difference) per raster point between the at least two colour channels of the photographic image of the printed item and the at least two colour channels of the reference image of the printed item, and
f) determining an authenticity of the printed item from a result of the comparing, thereby determining the authenticity from the noise pattern change as a result of the colour modulation change per raster point.

According to the invention, a photographic image of the printed item is made. The photographic image may be made by any suitable image capturing device, such as a digital camera, a laser reader or any optical device. A reference image of the printed item is stored in a database. The reference image provides an image of the original item, the reference image may be a photographic image of the original item or may be an image file derived from a master file with which the original item was created. A noise parameter of the photographic image is determined. The noise parameter may be formed by any parameter that expresses a noise level contained in the photographic image. Likewise, a noise parameter of the reference image is determined. The noise parameter of the reference image may have been pre-calculated and stored in the reference database, or may be determined when needed. The noise parameter of the reference image is compared with the noise parameter of the photographic image of the printed item. The noise parameters relate to noise that is invisible to a human observer, i.e. noise that the human observer using normal eyesight—i.e. without using tools such as optical or computer magnification, digital filtering, etc.—will not or substantially not see, as the spatial frequency and amplitude are outside a range of observation of the human eye. The noise pattern may be present in the authentic printed item in a form of quantisation noise, or may be an added noise pattern, such as a pseudo random noise pattern or a random noise pattern that has been inserted in a printing pattern of the printed item. The noise pattern reflects a raster point to raster point variation in colour, and possibly a raster point to raster point variation in intensity. The raster may be a screen print raster or any other printing raster. The noise pattern may be presented in two or more colour channels of the authentic one of the printed item, e.g. may be provided in a digital master file from which the authentic printed item is printed in a printing process.

The invention is based on the insight that a copy of a printed item will be made using a copying process that starts from an original item. In such a copying process, a new digital master file may be created that provides a copy of a design of the printed item. The unofficial digital master file will be created from an original item. Thereto, the original item will be scanned by a scanner or a sampling of it's exterior will be made otherwise (by photographing, scanning, or any other suitable capturing technique). A (spatial) sampling rate of the scanner or other device used in the copying technique, will be different from a sampling rate as applied in the original digital master file. Also, the sampling rate if the scanner or other device used in the reproduction printing technique will be different from a resolution as applied in a reproduction technique (e.g. a digital printing process) that was applied to create the original item from the original digital master file. There differences in sampling rate will translate into aliasing effects during the copying process. Also, image processing as applied in the copying process may require filtering in order to suppress aliasing effects. For example, the original master file may be formed by a CMYK file (CMYK being an abbreviation of Cyan, Magenta, Yellow and Kontrast (i.e. black) and representing a file format in common printing process colors CMYK). The scanning equipment as applied during the copying process may generate an RGB file, as its imaging sensors commonly detect the colours R (red), G (green) and B (blue). Thus, the copying process may require the conversion of obtained RGB data into CMYK data required to print copies of the printed item, such conversion may require filtering to suppress aliasing effects.

In order to at least reduce such aliasing effects, filtering will normally be applied in the copying process, i.e. in the generation of a "reconstructed" master file used in the printing process of the printing of the copy of the printed item. The inventors have realised that such filtering will not only translate into a reduction of aliasing effects, however will also result in a reduction of noise. Furthermore, the inventors have realised that a distinction between an original of the printed item and a copy of the printed item can hence be made by comparing noise parameters.

Furthermore, when printing an item, combinations of ink of different colour channels (e.g. Cyan, Magenta, Yellow and Kontrast/black) will result in mixing colours so as to create colour tones of a colour palette. In the re-sampling process of creating the copy, the different colour channels would need to be retrieved from these mixed colours comprised of different colour channels (colour rasters of the different colour channels would need to be derived from a scanned image). Visually highly similar colour may be obtained from different combinations of colour channels. As a simple example: black may be obtained from K or from a mixture of C, M and Y. As another example, violet is obtained from 40% magenta and 60% cyan, while slightly different mixtures, such as 40.5% magenta and 59.5% cyan will result in a visually same colour.

The printing technique may apply various modulation techniques to modulate colour of dots of a printing raster, such as dot size (a larger size implies more ink), dot shape (the larger the size of a dot, shape may be moved away from round to e.g. square, so as to prevent ink from flowing between neighbouring dots thereby closing blank spaces between the dots) and dot positioning (a larger distance between the dots implies less ink thus less colour intensity and vice versa). Also, hybrid modulations applying combinations of two or three of these modulation techniques may be applied. The colour modulation change may hence apply at least one of a size change, a shape change and a positioning change.

The inventor has realised that a distinction between original and copy may be derived from differences in colour channels, i.e. a colour modulation change, e.g. per raster point, and that such differences in colour channels may be derived by comparing noise in the colour channels of original and (alleged) copy. Due to the noise pattern, each colour channel is provided with an (e.g. random or pseudo random) raster point by raster point variation. The noise pattern per colour channel may be uncorrelated or pseudo-uncorrelated, so that the colour balance of neighbouring, visually identical raster points, may slightly differ from each other due to the noise. The copying process would hence need to retrieve and duplicate a colour mix of each raster point in order to duplicate the visual appearance as well as the raster point by raster point variation in colour mix due to the noise pattern. When the printed item that is assessed is a result of a copying process, the scanning, resampling, filtering etc. will have resulted for each raster point in deviations of the colour channel mix of the original image as compared to the copied image, and consequently, the small raster point by raster point variations due to noise may change in the copying process. The resulting deviations of each raster point may result in a change of noise levels as seen in the colour channels. Hence, comparing such noise levels with the original may establish if the item is authentic or not. As the photographic image may usually comprise the colour channels Red (R), Green (G) and Blue (B), possibly including some sensitivity in the near infrared and near ultraviolet wavelength ranges, the noise parameters in e.g. the CMYK colour channels, may be derived from any combination of R, G and B, e.g. from the RGB colour channels of the photographic image.

Due to the effects of the anti aliasing filtering in the process of creating the copy, a noise parameter of the copy may be lower then a noise parameter of the original. Thus, an authentication can be made to determine if a printed item is authentic or not by comparing a noise parameter of the original with a noise parameter of a printed item of which authenticity is to be determined, and in case the noise parameters appear to differ to at least a certain extent, the printed item of which the authenticity is to be determined is likely to be a copy.

The printed item may be any physical item having a printed pattern on it, i.e. having a part that is provided with a printed pattern. Examples of the printed item include labels of branded consumer luxury articles (such as perfumes, liquors, fashion items, jewelry, watches, etc.), wallpaper and laminate paper as a base for purpose as flooring and furniture, identification documents (such as passports, driving licenses, ID cards), certificates, credit or debit cards and bank notes.

The image capturing device may be any image capturing device, such as a digital camera, a smart telephone provided with a camera, a scanner, a laser detection device such as a laser scanner, etc.

The reference image may be obtained from a database, such as a local database (e.g. encrypted to prevent unauthorized access) or a remote database that is connected via a communication network (such as the internet) to the image capturing device that captures the image.

The authenticity of the printed item may be expressed using a probability score or in a form of several categories, e.g. categories such as "the printed item being likely to be authentic", "the printed item being likely to be a copy", etc. The term authenticity may be understood as the printed item being derived from the original master file that was used to produce (e.g. print) the printed item. An authentic product may be understood as a product that was produced by an authorized manufacturer. The authorized manufacturer made use of the original master file in the production of the product. Likewise, a non-authentic copy of the printed item may be understood as a copy that was produced by a non-authorized manufacturer, i.e. a copy that was not produced making use of printing from the original master file. Instead the non-authorized item may have been produced using printing from a reconstructed master file obtained from a scan or photograph of the printed item.

In an embodiment, determining the authenticity of the printed item from the result of the comparing comprises establishing from the reference noise parameter of the reference image and the test noise parameter of the printed item if a reference noise level in the reference image exceeds a test noise level in the photographic image of the printed item by a predetermined amount. If the reference noise level (i.e. the amount of noise in the reference image) exceeds the test noise level (i.e. the amount of noise in the image obtained from the printed item) by the predetermined amount, the printed item is likely to be a copy. The predetermined amount may hence form a minimum threshold, in case of a difference between the noise parameters in the photograph of the printed item and the reference image, which difference exceeds the predetermined amount, the printed item may likely be a copy.

In an embodiment, the predetermined amount is determined from a comparison of photographic image of authentic ones of the printed item and photographic images of copies. Alternatively, the predetermined amount may be obtained from a calculation of noise levels in the original item and from an estimation of anti aliasing filter bandwidth that may be applied during the process of the generation of a look alike (copied) digital master file. The estimation of the anti aliasing filter bandwidth may be derived from the screen ruling or dot frequency (the printed pattern applying e.g. an Amplitude Modulated, Frequency Modulated or Digital Modulated pattern) of the original image, as the spatial frequency of the raster will have a relation to the sampling spatial frequency and the filter bandwidth.

In an embodiment, the noise pattern change comprises a luminance noise pattern change, the authenticity being determined from the luminance noise pattern change. When a printed matter is copied, so scanned, re-separated and re-printed, the luminance noise will change due to the scanning process and the re-separating process will never be fully equal to the original which will result in a change of the luminance noise per colour channel or the average of the (e.g. three) colour channels together. The luminance noise will change as changes in modulation levels may translate into changes in raster point shape (e.g. round versus rectangular) and modulation type (raster point amplitude modulation versus raster point frequency modulation). The luminance noise of the photographic image is compared to the corresponding reference source file. If this difference exceeds a certain level the target might be considered counterfeited.

In an embodiment, the noise pattern change comprises a chrominance noise pattern change, the authenticity being determined from the chrominance noise pattern change. The term chrominance noise may be understood as a standard deviation of the Δab distances, square root of $((\Delta a^*)^2+(\Delta b^*)^2)$. Here, the a-channel describes colours from green to red, the b-channel from yellow to blue. Chrominance noise and luminance noise together constitute a total noise. Using only the chrominance noise as a base may for example be done if a source is only printed once with a single set of colours within a very narrow bandwidth, such as a banknote or other high value printed matters. If the difference in chrominance noise exceeds a certain level the target might be considered counterfeited In an embodiment, the noise pattern change comprises a sum of a chrominance noise pattern change and a luminance noise pattern change, the authenticity being determined from the sum of the chrominance noise pattern change and the luminance noise pattern change. The sum of the chrominance noise parameter and the luminance noise parameter may be defined as the standard deviation of the ΔE*ab colour distances, square root of $((\Delta L^*)^2+(\Delta a^*)^2+(\Delta b^*)^2)$. Although generally the luminance noise may be more important, the chrominance noise (colour noise) may also be taken into account, as recreating the original printing colours by counterfeiters may be very difficult as colours mix during the original printing process. By using the total noise, these differences can be detected even when the file is changed to match the source. If this difference exceeds a certain level the target might be considered counterfeited.

In an embodiment, the colour modulation change comprises at least one of a size modulation change, a shape modulation change and a position modulation change. As different modulation techniques to modulate colour of dots of a printing raster may be applied, such as dot size, dot shape and dot positioning (e.g. using dot frequency modulation, as well as hybrid modulations applying combinations of two or three of these modulation techniques (e.g. dot frequency/position at low intensity, dot size at mid/high intensity, combined with a dot shape change at mid intensity), the colour modulation change may hence provide at least one of a size change, a shape change and a positioning change.

In an embodiment, in at least two of the colour channels, the noise pattern comprised in the authentic one of the printed items is uncorrelated. When no correlation is provided between the noise in one of the colour channels and another one of the colour channels of the authentic copy, the colour changes of the raster as a result of the noise will be random, as the colour channels show uncorrelated (or lightly correlated) noise, causing that a copying process (scanning, remastering, etc.) will lose a substantial part of the noise information, as the random character of colour changes will to a large part get lost, causing a substantial difference between the noise pattern detected in the reference image and the noise pattern as detected in a non-authentic copy, providing a good distinction between authentic and non-authentic. When using 3 of 4 colour channels, such as CMY or CMYK, some degree of correlation may be provided between the channels or a subset thereof, for example, a combination of C, M and Y may be interchanged to some degree by K. Thus, when using 3 or 4 channels, uncorrelated or only lightly correlated noise in at least two of the colour channels may provide a similar effect of good distinction. In an embodiment, the test noise parameter is a signal to noise ratio and the reference noise parameter is a signal to noise ratio. Thus, the noise parameters may be signal to noise ratio's. The signal to noise ratio may be defined as a quotient of a signal in the image and the noise in the image. Making use of the signal to noise ratio, differences in the image (e.g. illumination level, illumination color, etc.) that translate into a difference in intensity and/or color, may be compensated for, as differences reflect differences in the signal component of the signal to noise ratio's, thus being taken into account.

In an embodiment, a low luminance area of the photographic image is excluded from the determination of the test noise parameter. All cameras add a certain level of noise to a file, at best found in very dark areas of an image. Hence the camera may set limits on the meaningful signal above or below the shadow or highlight threshold. In the dark areas of a photographic image file, the camera with which the photographic image has been taken, may significantly contribute to the noise in the photographic image: the camera may determine a noise floor. This noise is not present in the printed item and in order to avoid performing the comparison with the reference image based on camera noise, there can be a need to not use measurements close to this basic noise level for the comparison. Hence, very dark images may be rejected. Likewise, very dark image parts may be rejected, so as to omit dark areas in case of huge contrasts with some dark areas in the artwork.

In an embodiment, in a low luminance area of the photographic image, only a noise deviation towards the lighter is taken into account. Thus, the semi-deviations (standard deviation of values in one direction only) of the ΔL* distances may be determined. This may be useful in relation to the noise floor or highlight threshold where the deviation will be only into the lighter colours in very dark areas. The amount of this phenomena is also described as skew.

In an embodiment, in a high luminance area of the photographic image, only a noise deviation towards the darker is taken into account. Again, the semi-deviations (standard deviation of values in one direction only) of the ΔL* distances may be determined. This may be useful where the deviation will be only into the darker colours in light areas.

In an embodiment, the reference image of the printed item is a photographic reference image, hence providing that the reference image resembles the photographic image of the printed item as much as possible, providing similar levels of disturbance by the camera, e.g. similar levels of camera noise In an embodiment, the reference image of the printed item comprises an image of a coded pattern comprised in the printed item. The code pattern may be any optically (e.g. machine-) readable code pattern, e.g. readably by an optical device, such as a digital camera device, a smartphone, etc. The code pattern may represent any information (data). The code pattern may e.g. be a binary 1-bit pattern, a 2-bit pattern, a spread spectrum pattern, which is spread in a spatial frequency domain, etc. The code pattern may be provided in the colour patterns one time or may be repeated, e.g. in horizontal and/or vertical direction, e.g. providing an array of identical or different patterns arranged in the colour patterns (e.g. colour patterns each forming a monochrome pattern of an ink colour that is applied in the printing process, such as the Yellow, Cyan, Magenta en Kontrast colour patterns) of the printed item. The code pattern in the colour pattern(s) may be provided by modulation, superposition and multiplication or in any other way. The code pattern may be brought into at least one of the colour patterns, and may have been adjusted in order to reflect characteristics of the printing process. The adjusting of the code pattern may for example comprise adjusting a modulation depth, such as adjusting a modulation depth per colour pattern, locally adjusting a modulation depth in specific areas, etc, e.g. in order to set a modulation depth in such as way that the pattern may be invisible or almost invisible to the human eye. Also, depending on the characteristics of the process (such as the printing resolution) a pitch of the code pattern may be set, for example by scaling the code pattern. The (set of) colour patterns may be formed by a data set of e.g. monochrome graphical patterns, each representing an ink pattern of a respective ink colour to be applied onto the substrate by the printing process, so as together form a visual appearance of the printed matter. The method of providing a code pattern in a set of colour patterns may for example be performed in software by a suitable programmed computer device.

In an embodiment, the coded pattern comprises a pseudo random noise pattern. A pseudo random noise pattern is a signal similar to noise which seems to lack any definite pattern. A pseudo random noise pattern may consist of a deterministic sequence of pulses that will repeat itself after its period. The pseudo random noise pattern can be determined with a digital key and the repetition period may be very long, even millions of digits. A key is a piece of information (a parameter) that determines the functional output of a cryptographic algorithm. Thus, the method of the present invention may be performed on variances occurring in the colour patterns themselves, i.e. quantisation noise, etc, or, in accordance with the present embodiment, a pseudo random noise pattern may be added based on which a detection accuracy may be enhanced, as differences between original and copy may be increased thereby.

In an embodiment, a spatial frequency of the coded pattern extends in a frequency range above 1.5 times the screen ruling of an original one of the printed item. As a result, during the copying process, a high frequency content of the coded pattern may be suppressed by anti aliasing filters thus providing a substantial reduction in noise level of a copied (non-original) one of the printed item.

In an embodiment, prior to determining the noise parameter of the photographic image, the photographic image is cropped. Thereby, a part of the photographic image may be selected, for example a part which is known to have a large noise content, or a part where a (coded pattern provided in the digital master file. Such a pattern may e.g. be invisible or virtually invisible to the human eye. Less relevant parts of the image may hence be disregarded, thereby increasing estimation reliability.

In an embodiment, in case a difference between the noise parameter of the photographic image and the noise parameter of the reference image exceeds a matching criterion, the method further comprises:
cropping another part of the photographic image and repeating steps c)-f) using the photographic image cropped to the other part. Thus, in case it appears that no reliable detection can be performed from the selected part of the photographic image, another part of the photographic image is selected and the process is repeated for that other part.

In an embodiment, the method comprising
determining a sharpness (i.e. a focus) of the photographic image,
comparing the sharpness of the photographic image to a sharpness threshold, and
instructing a user to repeat taking a photographic image of the printed item in case the sharpness does not exceed the sharpness threshold. Thus, in case a sharpness is not high enough due to e.g. motion blur, lack of optical focus, low light conditions, etc, the user may be instructed to take another, better quality photo.

In an embodiment, the method further comprising adapting a color balance of the photographic image to a color balance of the reference image. Adapting a color balance by means of image processing techniques applied to the photographic image may compensate for differences in environmental conditions (e.g. ambient light and light color, shade etc.) in the photographic image as compared to the reference image.

In an embodiment, the step of retrieving reference data of the printed item comprises:
sending to a database information about a type of image sensor that has been applied to capture the photographic image of the printed item, the database having stored therein a plurality of reference images each being associated with a type of image sensor, and
the database returning the reference image associated with the type of image sensor that has been applied to capture the photographic image of the printed item. Different camera types may provide for differences in the photographic image as obtained from the printed item. These differences may be due to different image capturing sensors, different optics, different in image processing, etc. In order to take account of these differences, the reference image may be stored for a plurality of device types, e.g. different camera's, different smartphones, etc. and the reference image associated with the type of the device being taken into account.

A scan file of a printed matter contains pixels with a certain lightness, for a comparison mean values of the pixels per sample should be equal or nearly equal to the reference image. To achieve a correct resolution and an equal amount of dots per rectangle, the user is asked to take a plurality of photo's, e.g. 5 or 6 photos on a certain distance from the printed matter guided by a template. The sharpest image is selected and used for comparison, provided that an at least minimal predefined sharpness value is reached. The photographic image and the reference image may be divided in rectangular, e.g. square tiles in a size between e.g. 10 and 100 pixels, size depending on resolution, amount of dots per inch or cm, average lightness, and deviation in light when the target picture was taken. To achieve this equality with enough quality, the photographic image is changed per tile (e.g. changing luminance) to match the reference image per tile, which may eliminate or at least reduce differences in average lightness.

As target files should not be compared to source files when the differences are too large (some designs are made in twelve or more color versions), the average darkness of a target file is measured and then compared to the most nearby coloured source. Three or more reference source files (light-middle-dark) can be chosen for this purpose so as to provide a most matching reference image as a starting point for the comparison.

In an embodiment, the method comprising, prior to obtaining the photographic image of the printed item:
displaying to the user a sample image of at least part of the printed item, and
prompting the user to capture the photographic image of the printed item substantially overlapping with the sample image. The sample image provides to the user a visual representation that enables him/her to easily recognize what part of the printed item is to be photographed, and from what distance and angle, so as to obtain a photographic image that equates the reference image to a large extent, thus providing less disturbance due to differences in perspective, distance, etc.

The sample image may be displayed as an overlay image, thereby signalling by means of e.g. partially transparent, overlapping reference image and photographic sensor image, how the photo of the printed item would compare to the reference image. Thereby, an indication may be provided to the user in a convenient and easily understandable way which part of the printed item is to be photographed as well as from which angle and which distance, as a taking of a photo from the correct part, angle and distance will provide an overlap.

According to another aspect of the invention, there is provided a data processing terminal comprising an image capturing sensor and a data processing device, the data processing terminal being provided with a computer program comprising program instructions for making the data processing device to perform the method according to the invention. The method according to the invention may hence be implemented in the form of a software program comprising program instructions to perform the method steps. The program instructions may make the data processing terminal to photograph the printed item by means of its image capturing sensor, load the reference image (e.g. from an internal database holding reference images or from a remote database accessible via a data communication network, such as the internet), determine the noise parameters, compare the noise parameters and determine the authenticity. The determined authenticity may accordingly be presented to a user via a display of the data processing terminal, and/or may be communicated to a remote logging server that logs a capture of authentic/non-authentic items. In case the result in communicated to the remote logging server, the data processing terminal may further capture position data and communicate the position data to the remote logging server also, thereby providing a logging of locations where copies have been found.

Embodiments of the method may likewise be provided in the data processing terminal according to the invention, thereby providing same or similar effects. The data processing terminal may e.g. comprise a smartphone, or a digital camera, an optical laser reading device, a scanning device. e.g. in combination with a computer and/or a network device. Thus, the data processing terminal may either be formed by a single device such as a smartphone which performs a capture of the photographic image or may be formed by a combination of devices. Many combinations are possible. Some non-limiting examples are provided in this document. The data processing terminal may for example be formed by a device that captures an image, a device that performs data processing, and a device that communicates with a network e.g. in order to retrieve the reference image. An example of such combination may be a smartphone having a camera which captures the photographic image, a microprocessor of the smartphone determining noise parameters and/or performing cropping, scaling, etc, a touchscreen display of the smartphone providing user interaction, and a data communication interface of the smartphone providing a communication with a data processing network so as to enable to retrieve reference data from a corresponding (e.g. remote) database. The data processing terminal (e.g. smartphone) may be programmed with suitable software to enable the data processing device (e.g. microprocessor) to make the data processing terminal (e.g. smartphone) perform the method according to the invention. In another example, the data processing terminal may be formed by a combination of a digital camera, laser scanner or other imaging device that captures the photographic image, and a computing device such as a notebook computer, laptop computer, tablet computer, etc which performs other aspects of the method. The computing device and camera are each provided with a communication interface (e.g. Bluetooth, USB, Wifi, etc) for communication with each other, the computing device further being configures for communication with a reference database, either via a same communication interface or via another one.

According to a further aspect of the invention, there is provided:
a method of copy protecting a printed item, the method comprising:
a) providing a printing pattern master file of the printed item with a noise pattern in at least two colour channels,
b) printing the printed item according to the printing pattern master file including the noise pattern,
c) providing a reference image of the printed item, the reference image comprising the noise pattern in the at least two colour channels,
d) photographing a specimen of the printed item to obtain a photographic image of the specimen of the printed item,
d) determining a test noise parameter from the photographic image of the specimen of the printed item, wherein the test noise parameter reflects a noise pattern in at least two colour channels of the photographic image of the specimen of the printed item,
e) determining a reference noise parameter from the reference image, wherein the reference noise parameter reflects the noise pattern in the at least two colour channels of the reference image, f) comparing the test noise parameter to the reference noise parameter thereby deriving, from a difference between the test noise parameter and the reference noise parameter, a noise pattern change as a result of a colour modulation change per raster point between the at least two colour channels of the photographic image of the specimen of the printed item and the at least two colour channels of the reference image of the printed item, and g) determining an authenticity of the printed item from a result of the comparing, thereby determining the authenticity from the noise pattern change as a result of the colour modulation change per raster point.

By providing a printing pattern master file with the noise pattern as described, and detecting colour shifts of the raster points as described, a copy protection may be provided as unauthorized copies which are not printed from the original digital printing pattern master file, but from a reproduced master file, may be recognized. With the method of copy protecting, the same effects may be obtained as explained with reference to the method according to aspects of the invention as described above. Also, the same or similar preferred embodiments may be provided, providing the same of similar effects.

According to yet another aspect of the invention, there is provided a method of verifying an authenticity of a printed item, the method comprising:

a) photographing the printed item to obtain a photographic image of the printed item, b) retrieving reference data of the printed item, the reference data comprising a reference image of the printed item, c) determining a test noise parameter from the photographic image of the printed item, d) determining a reference noise parameter from the reference image, e) comparing the test noise parameter to the reference noise parameter, and f) determining an authenticity of the printed item from a result of the comparing. With the method according to the present aspect of the invention, the same effects may be obtained as explained with reference to the method according to aspects of the invention as described above. Also, the same or similar preferred embodiments may be provided, providing the same of similar effects. Furthermore, the noise patterns in the colour channels and associated detection of a noise pattern change as a result of a change of colour modulation due to a duplication process, as described above, may be applied in the present embodiment likewise as described above.

BRIEF DESCRIPTION OF THE DRAWINGS

Further advantages, features and effects of the invention will follow from the appended drawings and corresponding description, showing a non-limiting embodiment of the invention, wherein.

DETAILED DESCRIPTION OF THE INVENTION

Figure 1:
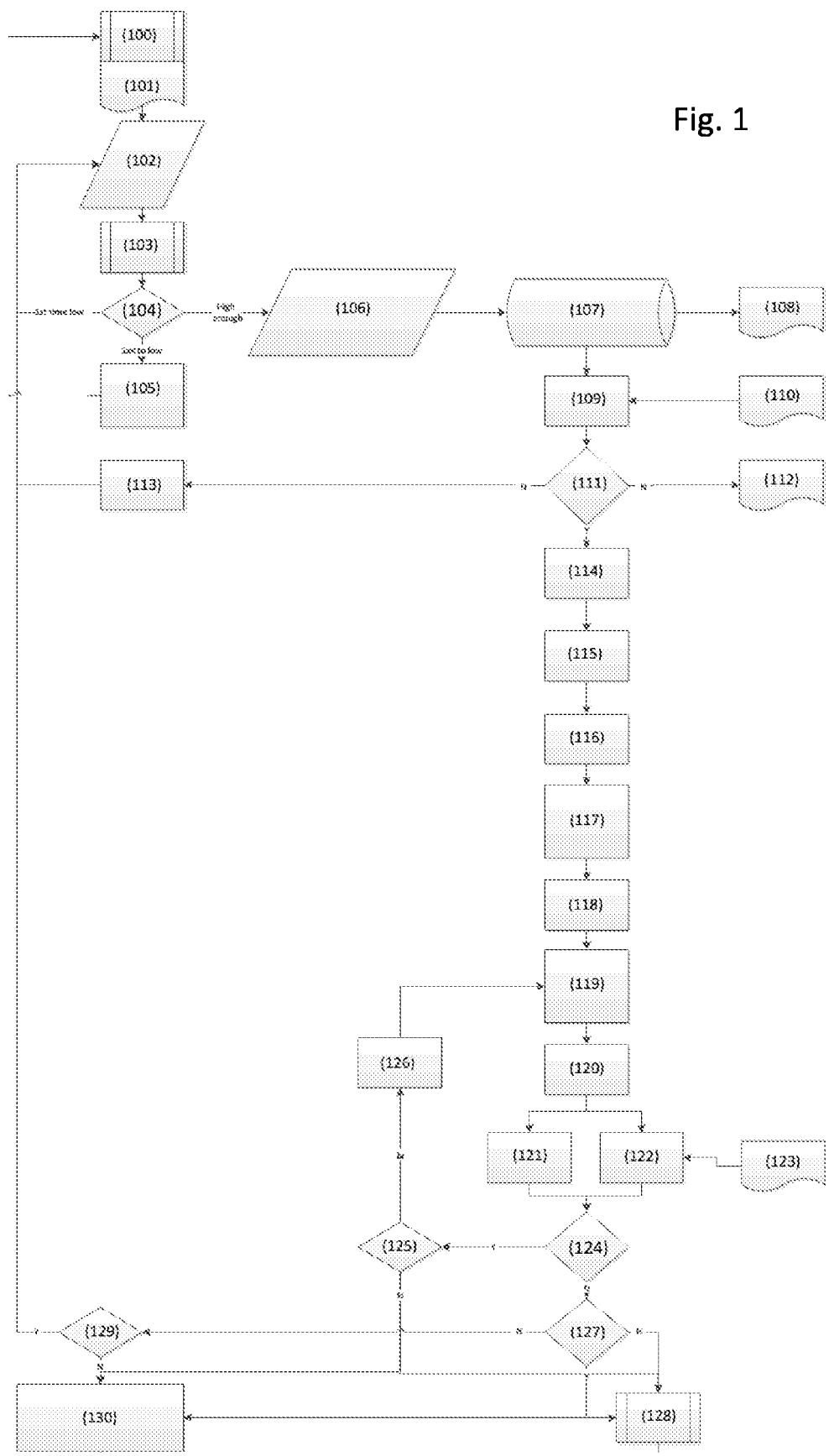
FIG. 1 depicts a flow diagram of a method according to an embodiment of the invention.
Figure 3A:
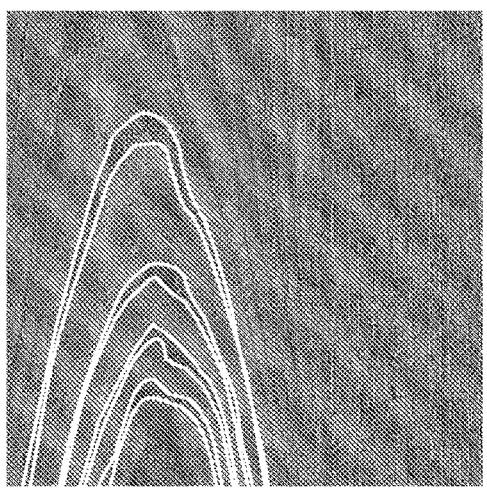
FIGS. 3A-3E depict examples of patterns in order to illustrate the method as described with reference to FIG. 1.
Figure 3B:

FIG. 1 depicts a flow diagram of a method of verifying an authenticity of a printed item. In step 100 a user initiates a validation process, in this example by pressing a validation button (e.g. on a smartphone touch screen display). In step 101, a printed item specific template is selected and displayed to the user as an overlay image. An example is depicted in FIG. 3A. The overlay image enables the user to choose a distance and perspective in such a way that the photographic image taken from the printed item may to a large extent correspond in terms of distance and part of the printed item to be photographed, to the reference image. The choice of a specific overlay in a range of overlays in the database in the app is defined by the code that is read at the start of the process. Then in step 102, a photographic image is taken from the printed item, in this example the smartphone takes 5 photographs (i.e. 5 photographic images). An example of a photographic image is depicted in FIG. 3B. These 5 photographs are checked on sharpness, this check itself is based on measuring contrast in each image where the highest level of contrast in an image stands for the best sharpness. Then, in step 103, a photographic sharpness of each of 5 photographic images is determined. In step 104 it is assessed if the sharpness exceeds a minimum required photographic sharpness, i.e. a threshold. If one of the photographic images does not exceed the threshold, step 102 is repeated. If none of the photographic images does exceed the threshold, the user is informed in step 105 that the process should be repeated under other, i.e. better illumination conditions. In this example, only the sharpest image (i.e. in this example the image having a highest level of contrast) is used for processing, all other images may be deleted at the end of the process. If approved in step 105, the process in step 106 continues by gathering data that are stored in the database such as date, time, location, type and kind of smartphone and more as far as users and laws admit to do so. In step 107, the process continues at a central server, such as a server associated with a reference database in which the reference image data is stored. It is noted that as an alternative, the process may likewise continue at the smartphone (or other data processing terminal).

Figure 3C:
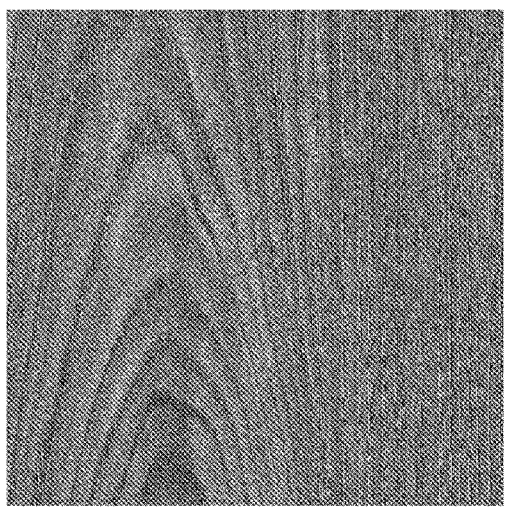

Then, in step 109, reference data is fetched from a reference database identified as 110. The reference data provides a reference image of an original one of the printed item, based on the characteristics of the smartphone e.g. image size, optical quality, threshold. An example of a reference image is depicted in FIG. 3C. Multiple reference images might exist to match different smartphone/camera/image capturing device characteristics. The reference image is now compared to the photographic images to check for a same content. This is done by comparing the images with a global object recognition in step 111. Thereby, it is verified if the printed item is photographed that corresponds to the printed item depicted in the reference image. If incorrect, an error is stored (step 112) and an error message is displayed to the user (step 113), after which the process returns to step 102. If the photographic images correspond, in step 114 the reference image is taken from the reference data and the reference file is closed in step 115. Then, in step 116, content and color of the photographic image is matched to the reference image. Thereto, a part of the photographic image non-corresponding to the reference image may be removed, and a color balance of the photographic image may be adjusted so as to substantially correspond to a color balance of the reference image. In step 117, the scanned image is aligned to the reference image by rotating/scaling/deforming etc. of the scanned image. Then, in step 118, the photographic image is cropped. The cropping may be performed to an area that has been previously specified (e.g. by coordinates), an area that exhibits a highest contrast, or an area showing certain features (i.e. an area in which e.g. a hidden pattern is provided in the original). The cropping may e.g. be performed to a selection of 250×250 pixels. Thus, by colour balancing and aligning, varying environmental factors such as illumination and slight differences in perspective from which the photo was taken as compared to the reference image, may be taken into account, while the cropping provides that only a relevant part of the photographic image is used for the further validation process, so that effects of less distinctive parts of the image may be disregarded. In step 119, the cropped scanned image is aligned again to the cropped reference image by rotating/scaling/deforming etc. of the scanned image. Then, a second cropping step is performed in step 120, in this embodiment to 100×100 pixels. In this exemplary embodiment, the steps of aligning, cropping, second aligning and a second cropping provide for a high accuracy. In other embodiments, a single cropping step may be applied.

Figure 3D:
Figure 3E:

A signal to noise ratio of the cropped photographic image is determined in step 121. Also, a mean luminance ratio of the cropped photographic image may be determined. Then, a quotient of the signal to noise ratio and the mean luminance ratio of the thus cropped photographic image is determined in step 121. Also, a quotient of the signal to noise ratio and the mean luminance ratio of the reference image (i.e. the cropped part thereof) is obtained in step 122, e.g. by means of calculation from the reference image or by means of obtaining it from a database 123. Determining a quotient of the signal to noise ratio and the means luminance ratio, as applied in the present embodiment, may enable to obtain a noise parameter in a similar order of magnitude, even when using reference images of cropped parts of reference images that exhibit different luminance. An example of a cropped reference image and a cropped photographic image is depicted in FIGS. 3D and 3E respectively.

In a printed item, combinations of ink of different colour channels (e.g. Cyan, Magenta, Yellow and Kontrast/black) will result in mixing colours so as to create colour tones of a colour palette. In the re-sampling process of creating the copy, the different colour channels would need to be retrieved from these mixed colours comprised of different colour channels (colour rasters of the different colour channels would need to be derived from a scanned image). Visually highly similar colour may be obtained from different combinations of colour channels. As a simple example: black may be obtained from K or from a mixture of C, M and Y. As another example, violet is obtained from 40% magenta and 60% cyan, while slightly different mixtures, such as 40.5% magenta and 59.5% cyan will result in a visually same colour.

The printing technique may apply various modulation techniques to modulate colour of dots of a printing raster, such as dot size (a larger size implies more ink), dot shape (the larger the size of a dot, shape may be moved away from round to e.g. square, so as to prevent ink from flowing between neighbouring dots thereby closing blank spaces between the dots) and dot positioning (a larger distance between the dots implies less ink thus less colour intensity and vice versa). Also, hybrid modulations applying combinations of two or three of these modulation techniques may be applied. The colour modulation change may hence apply at least one of a size change, a shape change and a positioning change.

The inventor has realised that a distinction between original and copy may be derived from differences in colour channels, i.e. a colour modulation change, e.g. per raster point, and that such differences in colour channels may be derived by comparing noise in the colour channels of original and (alleged) copy. Due to the noise pattern, each colour channel is provided with an (e.g. random or pseudo random) raster point by raster point variation. The noise pattern per colour channel may be uncorrelated or pseudo-uncorrelated, so that the colour balance of neighbouring, visually identical raster points, may slightly differ from each other due to the noise. The copying process would hence need to retrieve and duplicate a colour mix of each raster point in order to duplicate the visual appearance as well as the raster point by raster point variation in colour mix due to the noise pattern. When the printed item that is assessed is a result of a copying process, the scanning, resampling, filtering etc. will have resulted for each raster point in deviations of the colour channel mix of the original image as compared to the copied image, and consequently, the small raster point by raster point variations due to noise may change in the copying process. The resulting deviations of each raster point may result in a change of noise levels as seen in the colour channels. Hence, comparing such noise levels with the original may establish if the item is authentic or not. As the photographic image may usually comprise the colour channels Red (R), Green (G) and Blue (B), possibly including some sensitivity in the near infrared and near ultraviolet wavelength ranges, the noise parameters in e.g. the CMYK colour channels, may be derived from any combination of R, G and B, e.g. from the RGB colour channels of the photographic image.

Database 123 may be the same database as database 110, whereby in database 123 signal to noise ratio or other noise parameter is stored per image capturing device (e.g. per digital camera type, smartphone type, etc), so as to be able to take account of noise and other effects introduced by the image capturing sensor and image processing hardware/software of the image capturing device. The noise parameters of (the cropped part of) the photographic image and of the reference image are compared in step 124, and if the difference is too large e.g. more then 5-10% depending on parameters as resolution, optical quality etc., the process counts the attempt in 125 and selects in step 126 another part of the photographic image by cropping to these pre-specified coordinates to repeat the process as of step 119. Then, in step 127, it is determined If the noise parameter of the photographic image exceeds the noise parameter of the reference image by at least a predetermined amount, whereby a noise change due to colour shift of the raster points is determined as described above. If no, i.e. in case the noise parameters are sufficiently similar, the printed item is considered to be an original item and a corresponding result is displayed to the user in step 128. If yes, i.e. in case the noise parameter (noise level) of the reference image exceeds the noise parameter (noise level) of the photographic image by at least the predetermined amount, the corresponding result is determined in step 128 and displayed in step 130. If this noise ratio is higher then the predetermined amount but below another (higher) predetermined level, the result may be considered ambiguous. Then in step 129 it is established that the proofing cycle may be re-done from step 102 and the customer is asked to scan again in different light conditions.

Figure 2A:
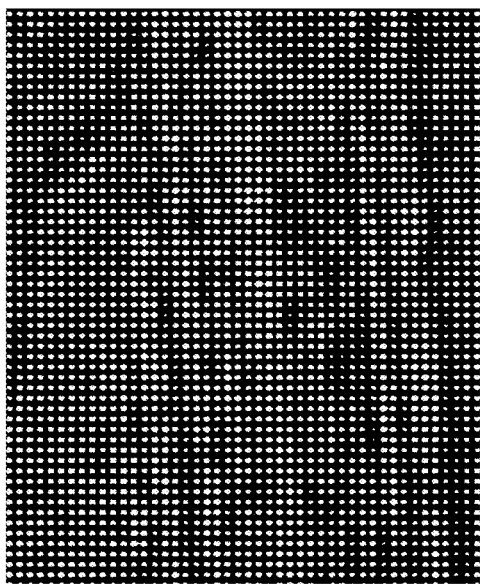
FIGS. 2A-2H depict printed patterns based on which an embodiment of the invention will be illustrated.
Figure 2B:
Figure 2C:
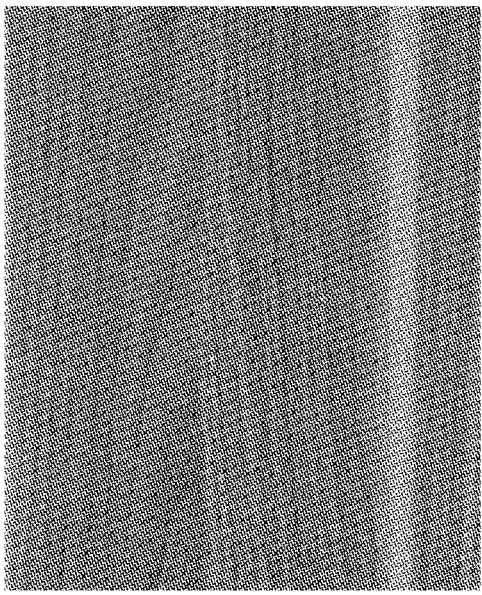
Figure 2D:
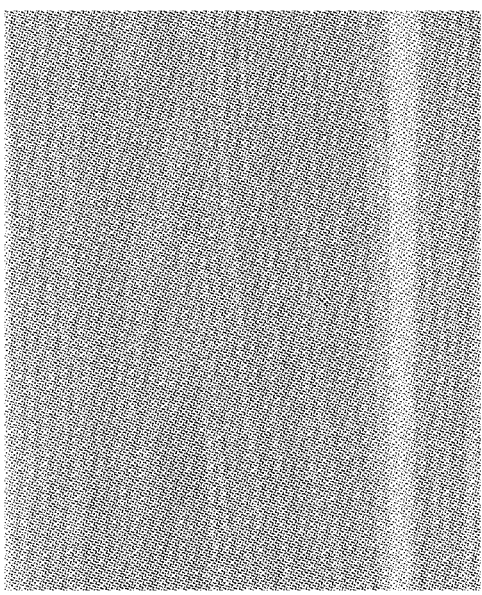
Figure 2E:
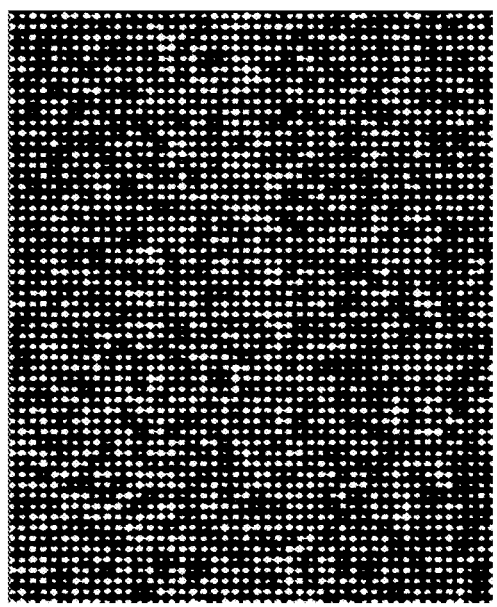
Figure 2F:
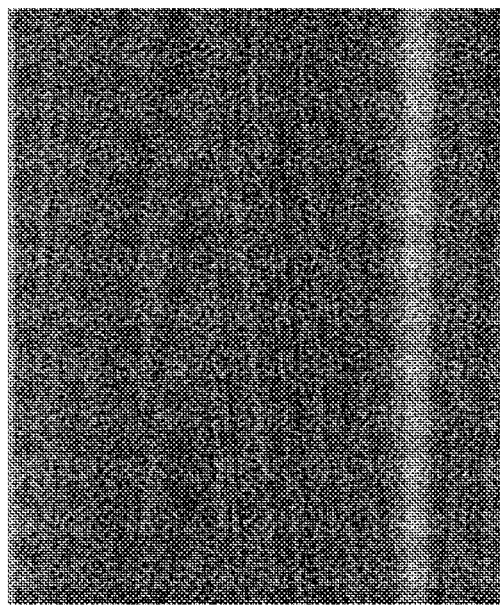
Figure 2G:
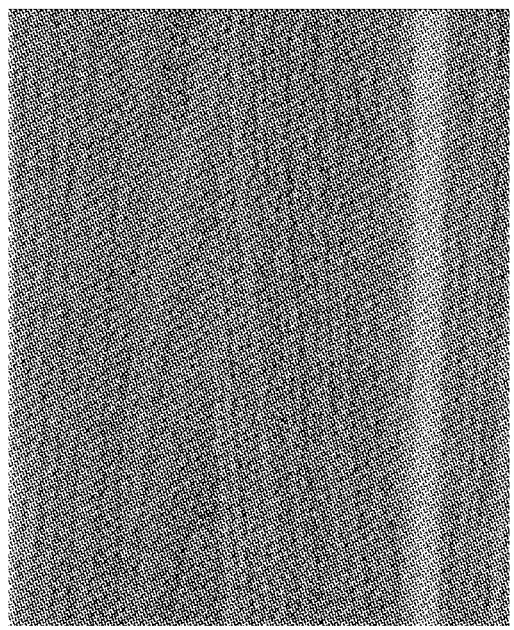
Figure 2H:
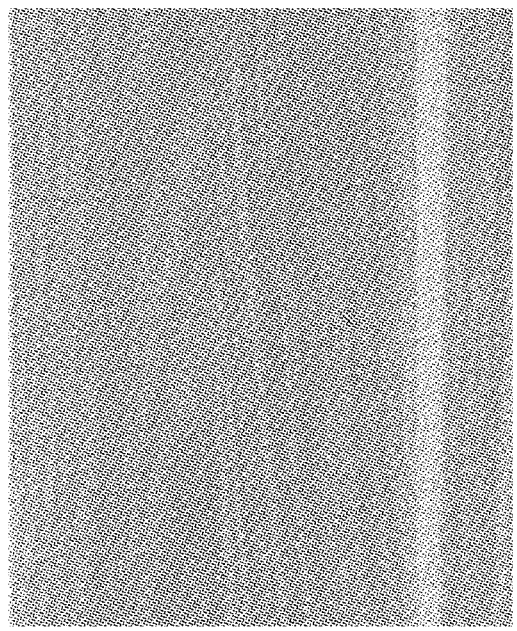

As an example, the validation process described in this document may be applied to laminate flooring panels. FIG. 2A-2D depict Dark (Cyan), Normal (Magenta), and Light (Yellow) raster patterns used in the printing of the laminate flooring panel. The yellow pattern is the lightest color and is printed as the first color in the printing sequence. Accordingly, FIGS. 2A and 2B depict Yellow color patterns on channels 1 and 2 respectively The magenta color is in the middle of the printing sequence and is depicted in FIG. 2C. The cyan pattern is used for the darkest printing color and is printed as the last color in the printing sequence and is depicted in FIG. 2D. Sometimes the yellow pattern is not used and only two patterns are printed. These patterns are the genuine patterns to print a replication of wood on paper.

Similarly, FIG. 2E-2H depict corresponding patterns, however provided with a code. A pattern with a machine readable but (to a human eye) virtually invisible code is added to the original patterns, when all colors are printed on top of each other the added code will be far less visible compared to the single channel. The code may provide a noise pattern, a pseudo noise pattern, a pseudo random pattern, etc. Thus, the code may be applied in embodiments according to the invention to add extra noise or noisy content that may facilitate a distinction between original and non-original in accordance with the method as disclosed in this document.

Accordingly, according to an aspect of the invention, there is provided a laminate flooring panel comprising a decorative printed pattern, the decorative printed pattern comprising a machine readable code pattern, such as a pseudo random noise pattern. In an embodiment, the decorative printed pattern comprises a plurality of colour patterns each having a different colour, the machine readable code pattern being provided in each of the colour patterns. In an embodiment, code pattern is virtually invisible to the human eye. Similarly, the method in accordance with the invention may be embodied whereby the item is a laminate flooring panel comprising a decorative printed pattern.

Figure 4:
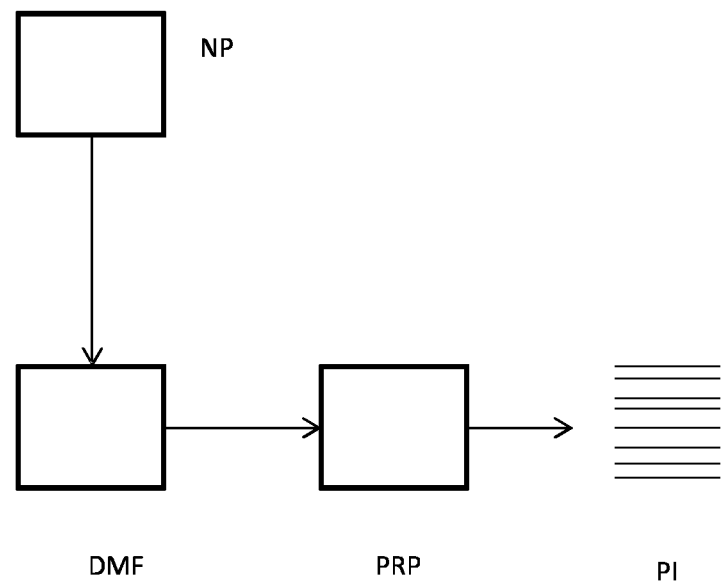
FIG. 4 depicts a block schematic view based on which the providing of a noise pattern in the printed item will be explained, FIGS. 5A and 5B provide a symbolic, graphical representation of colour channels, based on which some embodiments of the invention will be explained, and FIG. 6 provides a graph of luminance based on which some embodiments of the invention will be explained.

FIG. 4 highly schematically depicts a noise pattern NP that is provided into at least two colour channels of a digital master file DMF. The digital master file DMF represents a printing pattern and is used in a printing process PRP to generate authentic copies of the printed item PI.

Figure 5A:
Figure 5B:
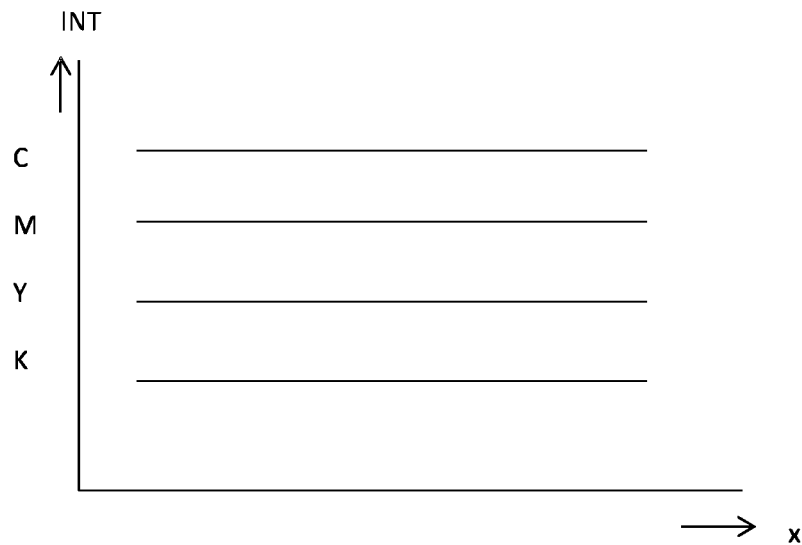

FIG. 5A provides a symbolic, graphical representation of an intensity INT (amplitude) of colour channels Cyan C, Magenta M, Yellow Y and black K along an axis X, e.g. along a line of the digital master file, in this example representing a uniform intensity along the line. The x-axis represents a line of adjacent raster points. In FIG. 5A, a noise pattern has been added to each of the colour channels, as represented by the gray probability band in which the signal plus noise will likely be. The amplitude may be modulated by any of the above described modulation techniques or any combination thereof. Hence, the noise provides for a change of the colour modulation of the raster points.

Figure 6:
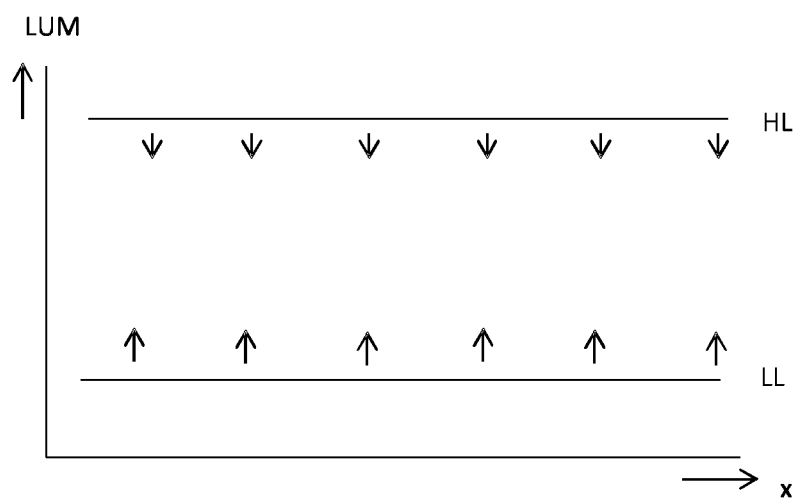

FIG. 6 depicts a highly schematic view of luminance LUM of raster points along a line X. A low luminance is represented by line LL and a high luminance is represented by line HL. As an example, at low luminance LL, only noise excursions towards the high luminance side may be taken into account, as represented by the upward arrow, thus keeping effects by camera noise or other noise sources (which would otherwise dominate at low luminance) low. As another example area's having a low luminance, e.g. below a certain luminance threshold, may be disregarded to prevent false determinations due to e.g. more dominant effects of camera noise. As another example, at a high luminance HL, only noise excursions towards a low side may be taken into account, as represented by the downward arrows, thus to prevent a possibly low detectivity at high luminance.

It is noted that the process may be performed by a data processing device, such as a smartphone, handheld computer, tablet, notebook, photocamera, data terminal, etc, being programmed with suitable software instructions. Instead of the signal to noise ratios, the process may make use of any other noise parameter, such as a noise level (e.g a noise power). The predetermined amount with which the noise parameter of the reference image and the photographic image are to differ, may be preset, e.g. based on experience, or may be determined from a comparison of authentic ones of the printed item and copies. The predetermined amount may be expressed in terms of experimental quantification to have the code as weak as possible due to invisibility but still enough for machine readability. The percentage in the calculated result is mostly lower then 3%. The printed item, e.g. its printed pattern may be provided with a code. The code may on the one hand provide a defined pattern to be used for the authentication, and on the other hand the code may comprise a noise component, or may even be entirely formed by noise, such as pseudo random noise, thereby the noise parameter being determined on such defined noise content in the reference image. Using such types of patterns may allow to provide a pattern that can be made virtually invisible to the human eye, while being detectable in a photographic image which images Red Green and Blue as separate image components.

The invention claimed is:

1. A method of verifying an authenticity of a printed item, the method comprising:
   a) photographing the printed item to obtain a photographic image of the printed item,
   b) retrieving reference data of the printed item, the reference data comprising a reference image of an authentic one of the printed item, the authentic one of the printed item comprising a noise pattern in at least two colour channels,
   c) determining a test noise parameter from the photographic image of the printed item, wherein the test noise parameter reflects a noise pattern in at least two colour channels of the photographic image of the printed item,
   d) determining a reference noise parameter from the reference image, wherein the reference noise parameter reflects the noise pattern in the at least two colour channels of the reference image,
   wherein the test noise parameter from the photographic image of the printed item is a test signal to noise ratio from the photographic image of the printed item based on the at least two colour channels and the noise pattern in the at least two colour channels of the photographic image of the printed item, and
   wherein the reference noise parameter from the reference image is a reference signal to noise ratio from the reference image of the printed item based on the at least two colour channels and the noise pattern in the at least two colour channels of the reference image,
   e) comparing the test signal to noise ratio to the reference signal to noise ratio thereby deriving, from a difference between the test signal to noise ratio and the reference signal to noise ratio, a colour modulation change between the at least two colour channels of the photographic image of the printed item and the at least two colour channels of the reference image of the printed item, and f) determining an authenticity of the printed item from a result of the comparing, thereby determining the authenticity from the colour modulation change between the at least two colour channels of the photographic image of the printed item and the at least two colour channels of the reference image of the printed item, the colour modulation change representing, in the case of a non-authentic printed item, a deviation of a replicated colour raster of replicated colour channels as derived from a scanned image during a replication process of the non-authentic printed item.

2. The method according to claim 1, wherein determining the authenticity of the printed item from the result of the comparing comprises establishing from the reference noise parameter of the reference image and the test noise parameter of the printed item if a reference noise level in the reference image exceeds a test noise level in the photographic image of the printed item by a predetermined amount.

3. The method according to claim 2, wherein the predetermined amount is determined from a comparison of photographic image of authentic ones of the printed item and photographic images of copies.

4. The method according to claim 1, wherein the noise pattern change comprises a luminance noise pattern change, the authenticity being determined from the luminance noise pattern change.

5. The method according to claim 1, wherein the noise pattern change comprises a chrominance noise pattern change, the authenticity being determined from the chrominance noise pattern change.

6. The method according to claim 1, wherein the noise pattern change comprises a sum of a chrominance noise pattern change and a luminance noise pattern change, the authenticity being determined from the sum of the chrominance noise pattern change and the luminance noise pattern change.

7. The method according to claim 1, wherein the colour channels comprise dots arranged on the colour raster the colour modulation change comprises at least one of a dot size modulation change, a dot shape modulation change and a dot position modulation change.

8. The method according to claim 1, wherein, in at least two of the colour channels, the noise pattern comprised in the authentic one of the printed items is uncorrelated.

9. The method according to claim 1, wherein a low luminance area of the photographic image is excluded from the determination of the test noise parameter.

10. The method according to claim 1, wherein in a low luminance area of the photographic image, only a noise deviation towards the lighter a higher luminance is taken into account.

11. The method according to claim 1, wherein in a high luminance area of the photographic image, only a noise deviation towards a lower luminance is taken into account.

12. The method according to claim 1, wherein the reference image of the printed item is a photographic reference image.

13. The method according to claim 1, wherein the reference image of the printed item comprises an image of a coded pattern comprised in the printed item.

14. The method according to claim 1, wherein the coded pattern comprises a pseudo random noise pattern.

15. The method according to claim 1, wherein a spatial frequency of the coded pattern extends in a frequency range above 1.5 times a screen ruling of an original one of the printed item.

16. The method according to claim 1, wherein prior to determining the noise parameter of the photographic image, the photographic image is cropped.

17. The method according to claim 16, wherein in case a difference between the noise parameter of the photographic image and the noise parameter of the reference image exceeds a matching criterion, the method further comprises:
cropping another part of the photographic image and
repeating steps c)-f) using the photographic image cropped to the other part.

18. The method according to claim 1, comprising
determining a sharpness of the photographic image,
comparing the sharpness of the photographic image to a sharpness threshold, and
instructing a user to repeat taking a photographic image of the printed item in case the sharpness does not exceed the sharpness threshold.

19. The method according to claim 1, further comprising adapting a color balance of the photographic image to a color balance of the reference image.

20. The method according to claim 1, wherein the step of retrieving reference data of the printed item comprises:
sending to a database information about a type of image sensor that has been applied to capture the photographic image of the printed item, the database having stored therein a plurality of reference images each being associated with a type of image sensor, and
the database returning the reference image associated with the type of image sensor that has been applied to capture the photographic image of the printed item.

21. The method according to claim 1, comprising, prior to obtaining the photographic image of the printed item:
displaying to the user a sample image of at least part of the printed item, and
prompting the user to capture the photographic image of the printed item substantially overlapping with the sample image.

22. The method according to claim 21, wherein the sample image is displayed as an overlay image.

23. A data processing terminal comprising an image capturing sensor and a data processing device, the data processing terminal being provided with a computer program comprising program instructions for making the data processing device to perform the method according to claim 1.

24. A method of copy protecting a printed item, the method comprising:
a) providing a printing pattern master file of the printed item with a noise pattern in at least two colour channels,
b) printing the printed item according to the printing pattern master file including the noise pattern,
c) providing a reference image of the printed item, the reference image comprising the noise pattern in the at least two colour channels,
d) photographing a specimen of the printed item to obtain a photographic image of the specimen of the printed item,
e) determining a test noise parameter from the photographic image of the specimen of the printed item, wherein the test noise parameter reflects a noise pattern in at least two colour channels of the photographic image of the specimen of the printed item,
f) determining a reference noise parameter from the reference image, wherein the reference noise parameter reflects the noise pattern in the at least two colour channels of the reference image, wherein the test noise parameter from the photographic image of the printed item is a test signal to noise ratio from the photographic image of the printed item based on the at least two colour channels and the noise pattern in the at least two colour channels of the photographic image of the printed item, and wherein the reference noise parameter from the reference image is a reference signal to noise ratio from the reference image of the printed item based on the at least two colour channels and the noise pattern in the at least two colour channels of the reference image, g) comparing the test signal to noise ratio to the reference signal to noise ratio thereby deriving, from a difference between the test signal to noise ratio and the reference signal to noise ratio a colour modulation change between the at least two colour channels of the photographic image of the specimen of the printed item and the at least two colour channels of the reference image of the printed item, and h) determining an authenticity of the printed item from a result of the comparing, thereby determining the authenticity from the colour modulation change between the at least two colour channels of the photographic image of the specimen of the printed item and the at least two colour channels of the reference image of the printed item, the colour modulation change representing, in the case of a non-authentic printed item, a deviation of a replicated colour raster of the replicated colour channels as derived from a scanned image during a replication process of the non-authentic printed item.

25. The method according to claim 1, wherein a same visually perceived colour of the printed matter is obtained by different modulations of the at least two colour channels, the authenticity being determined from a change between the modulation of the at least two colour channels in the photographic image of the printed item and the modulation of the at least two colour channels in the reference image.

26. The method according to claim 25,
wherein the colour channels comprise a Cyan, C, colour channel, a Magenta, M, colour channel, a Yellow, Y, colour channel and a Kontrast, K, colour channel,
wherein the authenticity is determined from the change between a modulation of the K colour channel versus a modulation of a mixture of the C, M, Y colour channels in the photographic image of the printed item, and
wherein the modulation of the K colour channel versus the modulation of the mixture of the C, M, Y colour channels in the reference image.

* * * * *